United States Patent
Lautenschlager et al.

(10) Patent No.: US 6,628,773 B1
(45) Date of Patent: Sep. 30, 2003

(54) PROCESS FOR PROVIDING THE SUBSCRIBER NUMBER OF THE CALLING SUBSCRIBER, SERVICE UNIT, AND PRIVATE COMMUNICATION NETWORK

(75) Inventors: Wolfgang Lautenschlager, Weissach-Flacht (DE); Hartmut Weik, Stuttgart (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/517,179

(22) Filed: Mar. 2, 2000

(30) Foreign Application Priority Data

Mar. 3, 1999 (DE) .......................... 199 09 110

(51) Int. Cl.⁷ ................................ H04M 7/00
(52) U.S. Cl. ................ 379/220.01; 379/221.09
(58) Field of Search .............. 379/219, 220.01, 379/221.01, 221.09, 221.08, 225, 221.14, 234, 207.02

(56) References Cited

U.S. PATENT DOCUMENTS 6,137,870 A * 10/2000 Scherer ................ 379/127.06

FOREIGN PATENT DOCUMENTS

DE            41 01 885 A1      8/1992

* cited by examiner

Primary Examiner—Benny Tieu
(74) Attorney, Agent, or Firm—Sughrue Mion, PLLC

(57) ABSTRACT

The invention relates to a process for providing the subscriber number of the calling subscriber in connection requests routed from a private communications network (PRNET) into a public communications network (PUBNET), and to a service unit (SCP) and a private communications network (PRNET) for the implementation of the process. The service unit (SCP) of the public communications network is triggered for a connection request routed from the private communications network (PRNET) into the public communications network (PUBNET) if the connection request is routed from the private communications network (PRNET) into the public communications network (PUBNET) in a local network area (AREA1 to AREA3) which does not correspond to the local network area (AREA1) assigned to the calling subscriber (A). If the service unit (SCP) is triggered for such a connection request, it determines the local network area code assigned to the calling subscriber (A) and ensures that this code is entered in the connection request as local network area code of the calling subscriber.

10 Claims, 3 Drawing Sheets

PROCESS FOR PROVIDING THE SUBSCRIBER NUMBER OF THE CALLING SUBSCRIBER, SERVICE UNIT, AND PRIVATE COMMUNICATION NETWORK

BACKGROUND OF THE INVENTION

The invention relates to a method for providing the subscriber number of the calling subscriber in connection requests routed from a private communications network (PRNET) into a public communications network (PUBNET) a service unit for supporting the provision of the subscriber number of the calling subscriber in connection requests and a private communications network incorporating such a service unit.

The invention is based on the facility "Transmission of Subscriber Number of Calling Subscriber" provided in an ISDN communications system (ISDN=Integrated Services Digital Network), described for example in DE OS 41 01 885 A1.

In the connection request routed through the ISDN communications system for the establishment of a connection in the direction of the called subscriber, the subscriber number of the calling subscriber is transported by the ISDN communications system to the terminal of the called subscriber, where the subscriber number of the calling subscriber is then displayed to the called subscriber or this information is used as input information for CSTA applications (CSTA= Computer Supported Telecommunication Application). This information can also serve as the basis for a call-back of the called subscriber.

It is therefore of particular importance that this information is correctly transmitted to the terminal of the called subscriber. However, this is not always the case if the calling subscriber is associated with a private communications network.

SUMMARY OF THE INVENTION

The object of the invention is to improve the quality of the transmission of the subscriber number of the calling subscriber in a connection request in the event that the calling subscriber is connected via a private communications network to the public communications network.

This object is achieved by a method for providing the subscriber number of the calling subscriber in connection requests, a service unit for supporting the provision of the subscriber number of the calling subscriber in connection requests, and a private communications network including such a service unit, all as described below.

The invention is based on the concept that the subscriber number of the calling subscriber is not correctly provided in the connection request if the connection request is routed from the private communications network into the public communications network in a local network area which does not correspond to the local network area assigned to the calling subscriber. A service unit of the public communications network detects such a connection request and ensures that the correct subscriber number of the calling subscriber is entered in the connection request.

The advantage of the invention is that ISDN and CSTA facilities based on information about the calling subscriber also function correctly for subscribers of private communications networks. This service can also easily be offered by a public communications network operator to large customers as an additional service.

Advantageous developments of the invention are described in the sub-claims.

BRIEF DESCRIPTION OF THE DRAWINGS

In the following the invention will be explained by way of example in the form of several exemplary embodiments, making reference to the attached drawings in which.

DETAILED DESCRIPTION OF THE INVENTION

Figure 1:
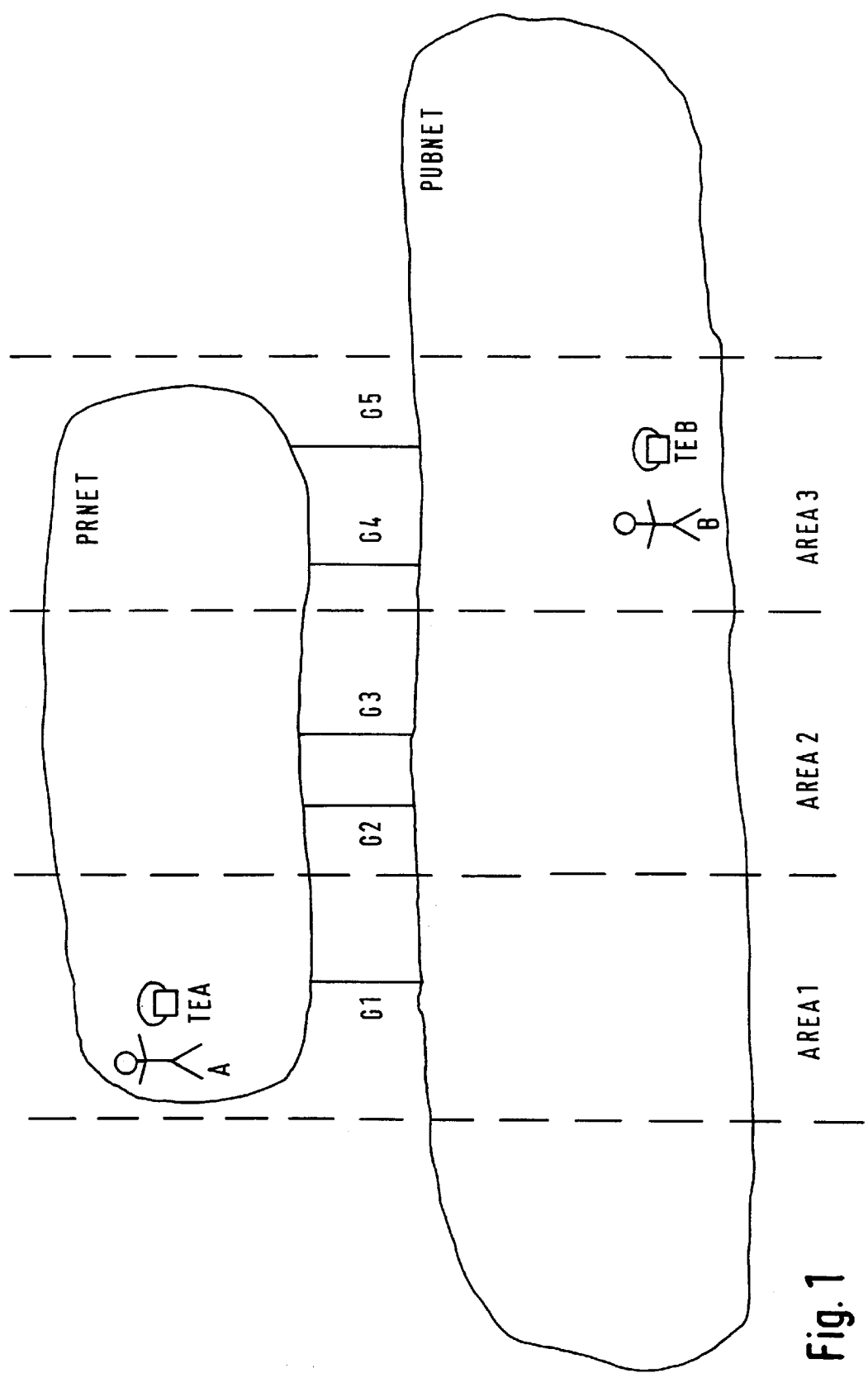
FIG. 1 is a block circuit diagram of a communications system comprising a public communications network and a private communications network.

FIG. 1 illustrates a communications system comprising two communications networks PUBNET and PRNET which are connected to one another via a plurality of gateways G1 to G5.

The communications networks PUBNET and PRNET represent telephone networks, for example ISDN telephone networks (ISDN=Integrated Services Digital Network). It is also possible for the communications networks PUBNET and PRNET to additionally serve for video and/or data transmission. It is also possible for terminals to be connected to the communications networks PUBNET and PRNET via an aerial interface, for example in accordance with the DECT standard (DECT=Digital European Cordless Telephony) or the GSM standard (GSM=Global System for Mobility).

The communications network PUBNET is a public communications network. It is formed by a plurality of interconnected exchanges which are themselves connected to a plurality of terminals. Of these terminals, by way of an example FIG. 1 illustrates a terminal TEB assigned to a subscriber B. Here it is possible for the communications network PUBNET to be formed by a plurality of subsidiary communications networks associated with different network operators. The subsidiary communications networks can also consist of mobile telephone networks, for example in accordance with the GSM standard (GSM=Global System for Mobility).

The communications network PRNET is a private communications network, for example the private communications network of a company. It is formed by one or more interconnected private branch exchanges to which the subscribers associated with the private communications network, for example the employees of the company, are connected via their respective terminals. Of these terminals, by way of an example FIG. 1 illustrates a terminal TEA assigned to a subscriber A. Here the private communications network PRNET is characterised by the fact that the terminals of the private communications network are addressed within the private communications network in accordance with a private numbering system. The gateways G1 to G5, which in each case comprise one or more exchange lines, facilitate the communication between subscribers of the private communications network PRNET and subscribers of the public communications network PUBNET.

If the private communications network PRNET comprises two or more interconnected private branch exchanges, it is also possible for these private branch exchanges to be interconnected via dedicated lines of the public communications network PUBNET. It is also possible for the private branch exchanges to be interconnected via switched lines of the public communications network PUBNET and thus for the private communications network PRNET to be a virtual private communications network. Individual terminals can also be integrated into such a virtual private network via switched lines of the public network PUBNET and through the support of a service of the public network PUBNET.

In accordance with the numbering system, the public communications network PUBNET is divided into a plurality of different, geographically orientated local network areas, of which three local network areas AREA1 to AREA3 are shown by way of example in FIG. 1. The local network areas represent independent numbering zones. To dial a subscriber of another local network area, it is necessary to dial the local network area code of the local network area to which the subscriber's terminal is assigned, and then to dial the subscriber number assigned to the subscriber within the local network area. The terminals of the private communications network PRNET are also governed by this numbering system. For calls out of the public communications network, depending upon their geographic location the terminals of the private communications network are assigned to one of the gateways G1 to G5 and thus are in each case assigned to one of the local network areas AREA1 to AREA3. To dial a subscriber of the private communications network PRNET, it is thus necessary to dial the local network area code of the gateway assigned to said subscriber, the subscriber number of the gateway, and the private branch exchange number of the subscriber.

Advantageously, the gateway assigned to the subscriber here is determined by the private branch exchange assigned to the subscriber, so that then the subscribers of the private communications network PRNET are each assigned the local area code of their corresponding private branch exchange or private branch exchange system.

The private communications network PRNET is assigned in part to the local network area AREA1, to the local network area AREA2 and to the local network area AREA3.

The terminal TEA of the private communication network PRNET is assigned to the local network area AREA1, and the terminal TEB of the public communications network PRNET is assigned to the local network area AREA3. If the subscriber A of the private communications network now dials the subscriber B of the public communications network, for the establishment of the connection a corresponding connection request is routed into the public communications network PUBNET via one of the gateways G1 to G5. In addition to the subscriber number of the called subscriber (dialled subscriber number) here the private branch exchange number of the calling subscriber is also contained in the connection request.

In the connection request routed from the private communications network PRNET into the public communications network PUBNET, the subscriber number of the calling subscriber is automatically assigned, by the public communications network PUBNET, the local network area code of that local network area in which the connection request has been routed into the public communications network PUBNET. This assignment, and the entry of the local network area code in the connection request, takes place upon the transition of the connection request into another local network area of the public communications network PUBNET or upon the arrival of the connection request in the public communications network PUBNET.

If the connection request is routed from the private communications network into the public communications network in a local network area which does not correspond to the local network area assigned to the calling subscriber, a service unit of the public communications network is triggered for this connection request routed from the private communications network into the public communications network. This is the case for example if the connection request is routed into the public communications network PUBNET not via the gateway G1 but via one of the gateways G2 to G5, for example because the gateway G1 is overloaded or it is more favourable from a charging standpoint to route the connection request into the public communications network PUBNET in the local area AREA3.

When the service unit is triggered for such a connection request, the service unit then determines the local network area code assigned to the calling subscriber, for example the code of the local network area AREA1, and ensures that this code is entered in the connection request as local network area code of the calling subscriber.

A first exemplary embodiment of the invention will now be described with reference to FIG. 2.

Figure 2:
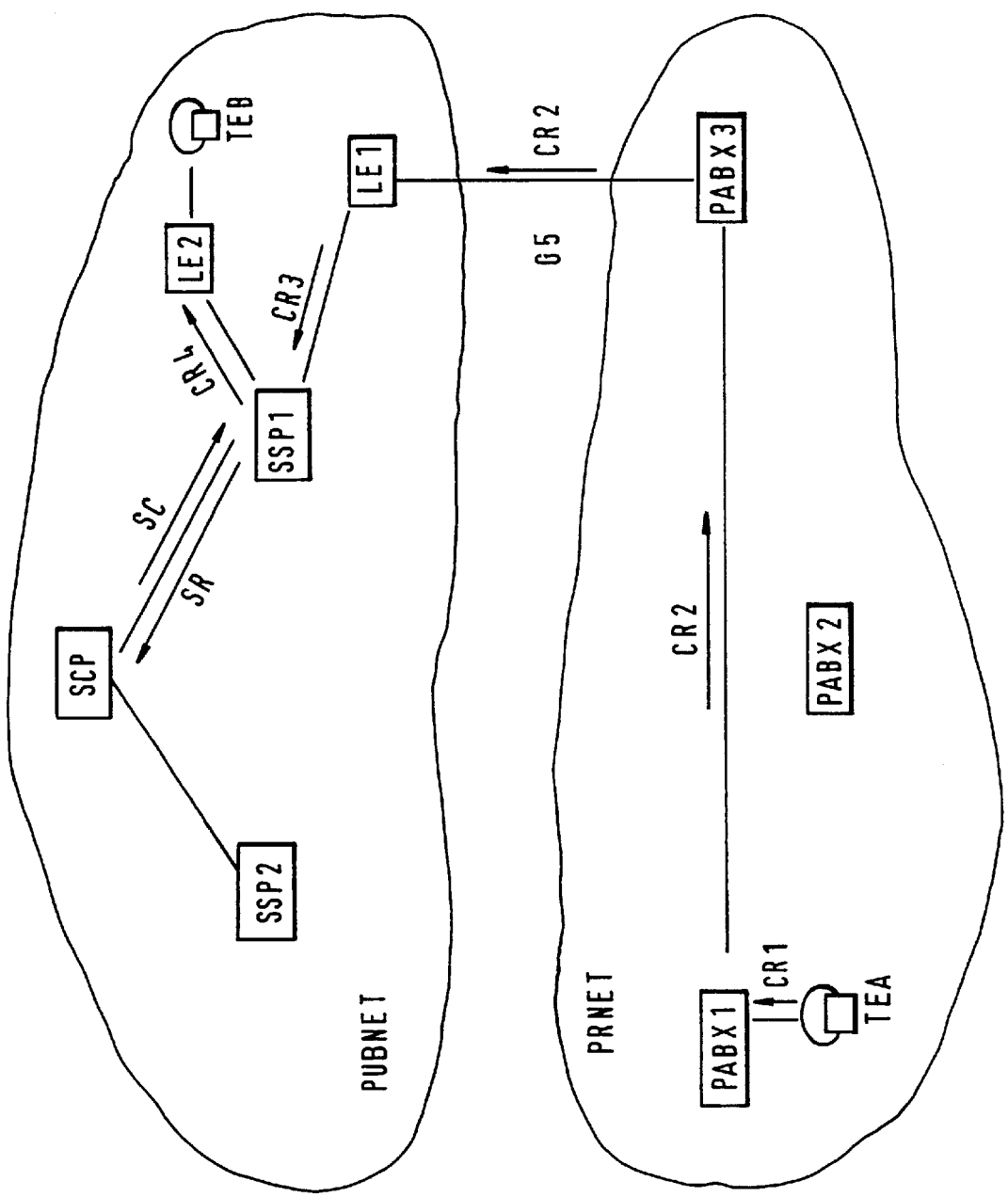
FIG. 2 is a functional diagram of the communications system according to FIG. 1 for a first exemplary embodiment.

FIG. 2 illustrates the communications networks PUBNET and PRNET with the terminals TEB and TEA, and the gateway G5.

In the exemplary embodiment, the private communications network PRNET comprises three private branch exchanges PABX1 to PABX3. The terminal TEA is connected to the private branch exchange PABX1, and the gateway G5 is connected to the private branch exchange PABX3. Each of the private branch exchanges PABX1 to PABX3 serves a different location of a company, each location being assigned to a different local network area.

The public communications network PUBNET comprises a plurality of exchanges, of which two subscriber exchanges LE1 and LE2 and two service exchanges SSP1 and SSP2 are shown by way of example in FIG. 2. The communications network PUBNET also comprises a service control unit SCP which is connected to the service exchanges SSP1 and SSP2.

The subscriber exchange LE2 represents the subscriber exchange assigned to the terminal TEB, and thus the terminal TEB is connected to this exchange. The subscriber exchange LE1 is connected to the private branch exchange PABX3 and provides the private branch exchange PABX3 with a network access into the public communications network PUBNET.

The service exchanges SSP1 and SSP2 provide service switching functions in accordance with IN architecture (IN=Intelligent Network). On the occurrence of a trigger event, for example the entry of a specific destination subscriber number in a connection request switched by the service exchange, they transmit a service request message with a corresponding service code via the signalling network to the service control unit SCP. In the service control unit SCP, a service logic device, which is assigned to the service code and provides a service for the connection request, is then activated. In the provision of the service, by means of control messages the service control unit controls the further processing of the connection request by the service exchanges SSP1 and SSP2. Here it is also possible that the service control unit SCP is not a unit separate from the service exchanges SSP1 and SSP2, but is formed by a program module running on the computer platform of a service exchange or is a service unit which is part of the controller of the service exchange SSP1 or of the subscriber exchange LE1.

The subscriber A of the private communications network PRNET requests the establishment of a connection to the subscriber B of the public communications network PUBNET by dialling the appropriate subscriber number which initiates the transmission of a connection request CR1 to the private branch exchange PABX1. A control unit of the controller of the private branch exchange PABX1 now provides a so-called least cost routing function for the requested connection:

From the dialled subscriber number, the said control unit determines the destination local network area of the call and, by means of this data, of the gateways G1 to G5 into the public communications network PUBNET, selects the gateway most favourably positioned relative to the destination local network area. The connection is thus routed as far as possible in the private network, and the gateway incurring the least connection charges in the public communications network PUBNET is selected.

If the thus selected gateway is not situated in the local network area assigned to the calling subscriber, the control unit of the private branch exchange PABX1 additionally inserts a service code into the connection request routed via the selected gateway into the public communications network PUBNET for the establishment of the connection. Here the subscriber number of the called subscriber is for example preceded by the service code.

A thus modified connection request CR2 is now transmitted via the private communications network PRNET to the private branch exchange PABX3 and from here via the gateway G5 to the subscriber exchange LE3. The subscriber exchange LE3 provides the function of a network access unit for the connection request CR2 and thus for example filters out, as faulty, subscriber numbers of the called subscriber entered in the connection request CR2 or local network area codes of this subscriber number containing a code which differs from the code of the local network area AREA3. This function could also be omitted or this function could also be sited in the service exchange SSP1.

A thus modified connection request CR3 is routed through the public communications network PUBNET to the service exchange SSP1, which detects the service code entered in the connection request CR3 and triggers a service unit of the public communications network, namely the service control unit SCP, for the connection request CR3 by transmitting a service request message SR. The service control unit SCP determines the local network area code assigned to the calling subscriber and by means of a control message SC ensures that this code is entered in the connection request as local network area code of the calling subscriber. A thus modified connection request now is routed via the subscriber exchange LE2 to the terminal TEB and the connection between the terminals TEA and TEB is established. Here it is also possible for this service code to be inserted in the connection request not by the private branch exchange PABX1 but by the private branch exchange PABX3, if this exchange detects that the calling subscriber associated with this connection request is assigned to a different local network area than the gateway G5.

It is also possible for the subscriber exchange LE1 to itself be a service exchange, and for the service control unit SCP to be integrated in the controller of this exchange.

It is also possible for no service code to be inserted in the connection request by the private branch exchange PABX1. In this case the service control unit SCP can be triggered by a network access unit of the public communications network PUBNET, which is made available for example by the subscriber exchange LE1 or by the service exchange SSP1. Such triggering can be effected for example by the insertion of a service code in the connection request CR2 or by the direct transmission of a message to the service control unit SCP. The network access unit effects such triggering if it detects a connection request from the private communications network in the case of which the local network area of the calling subscriber does not correspond to the local network area to which the network access unit is assigned.

Further embodiments of the invention will now be described making reference to FIGS. 3a to 3c.

Figure 3A:
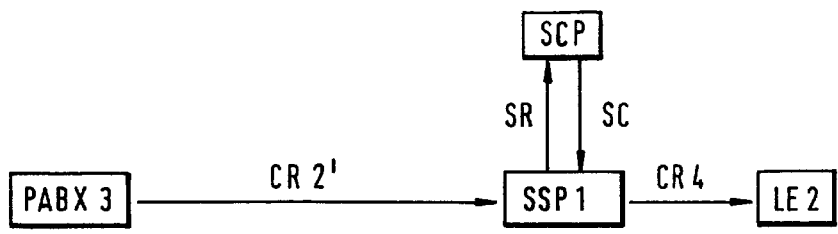
FIG. 3a is a functional diagram of a part of the communications system shown in FIG. 1 for a second exemplary embodiment.

FIG. 3a illustrates the private branch exchange PABX3, the service exchange SSP1, the service control unit SCP and the subscriber exchange LE2.

In this exemplary embodiment, the service exchange SSP1 provides the function of a network access unit. In the private communications network PRNET, the subscriber number of the called subscriber, and additionally the local network area code assigned to the called subscriber, are entered in the connection request if the connection request is routed into the public communications network in a local network area which does not correspond to the local network area assigned to the calling subscriber. Then the connection request is routed into the public communications network PUBNET as connection request CR2'. Advantageously, here the entry of the local network area code is effected by the private branch exchange PABX1. If, as described in the foregoing, the service control unit SCP now is triggered for a connection request, the service control unit SCP determines the local network area code from the connection request CR2' and enters the local network area code of the calling subscriber contained in the connection request at the position provided therefore in the connection request. Another possibility would be for the local network area code to be entered at the provided position by the private branch exchange PABX1 and for the service control unit SCP to cancel the alteration of the local network area code of the calling subscriber effected by the network access unit.

Figure 3B:
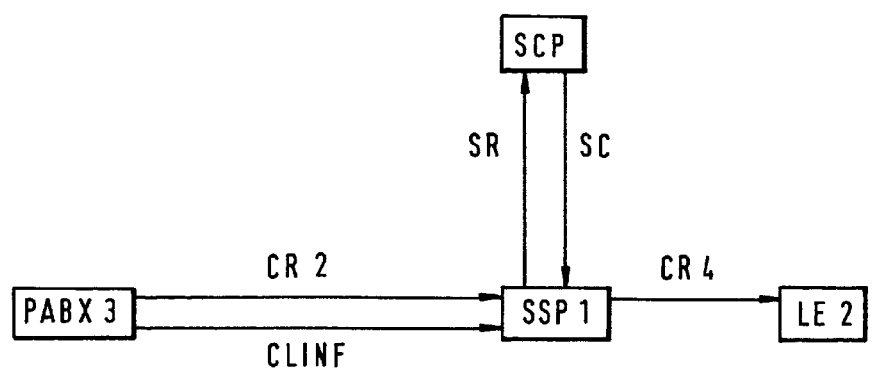
FIG. 3b is a functional diagram of a part of the communications system shown in FIG. 1 for a third exemplary embodiment.

FIG. 3b illustrates the private branch exchange PABX3, the service exchange SSP1, the service control unit SCP and the subscriber exchange LE2.

In the private communications network PRNET, the internal subscriber number of the calling subscriber is entered in the connection request which is routed into the public communications network PUBNET as connection request CR2. In addition, the local network area code assigned to the calling subscriber is transmitted in a signalling message CLINF, in addition to the connection request CR2, from the private branch exchange PABX1 or PABX3 into the public communications network PUBNET, if the connection request CR2 is routed into the public communications network PUBNET in a local network area which does not correspond to the local network area assigned to the calling subscriber. The signalling message CLINF is used by the service control unit SCP, which has been triggered for the connection request CR2 as described in the foregoing, to determine the local network area of the calling subscriber. Then the service control unit SCP enters this local network area code of the calling subscriber in the connection request at the position provided therefor.

Figure 3C:
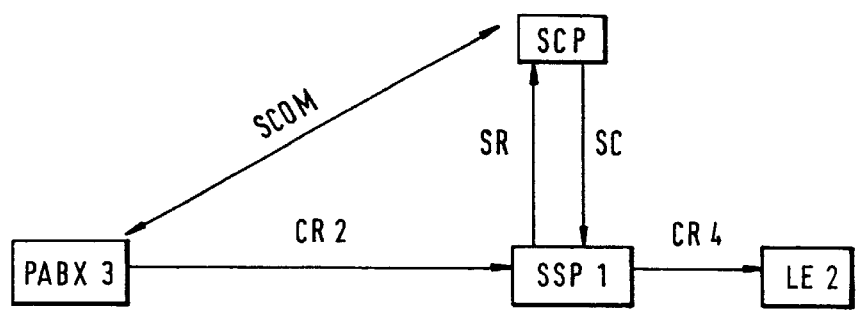
FIG. 3c is a functional diagram of a part of the communications system shown in FIG. 1 for a fourth exemplary embodiment.

FIG. 3c illustrates the private branch exchange PABX3, the service exchange SSP1, the service control unit SCP and the subscriber exchange LE2.

If the service control unit SCP is triggered for the connection request CR2 as described in the foregoing, it contacts a service unit of the private communications network PRNET in order to determine the local network area code assigned to the calling subscriber. Such a service unit can for example be a program module running in the controller of the private branch exchange PABX3 or PABX1. The interchange of messages SCOM with this service unit preferably takes place via the signalling network. At the request of the service control unit SCP, this service unit now determines the local network area code of the calling subscriber of the connection request CR2 and sends back this data to the service control unit SCP, which then enters the thus determined local network area code at the position provided therefor in the connection request.

What is claimed is:

1. A method for providing the subscriber number of the calling subscriber (A) in connection requests routed from a private communications network (PRNET) into a public communications network (PUBNET), characterised in that a service unit (SCP) of the public communications network (PUBNET) is triggered for a connection request routed from the private communications network (PRNET) into the public communications network when the connection request is routed from the private communications network (PRNET) into the public communications network (PUBNET) in a local network area (AREA1 to AREA3) which does not correspond to the local network area (AREA1) assigned to the calling subscriber (A) of the connection request, and that when it is triggered for such a connection request, the service unit (SCP) determines the local network area code assigned to the calling subscriber (A) of the connection request and ensures that this code is entered in the connection request as local network area code of the calling subscriber.

2. A method according to claim 1, characterised in that in the private communications network (PRNET), a service code is inserted in a connection request when the connection request is routed into the public communications network (PUBNET) in a local network area (AREA1 to AREA3) which does not correspond to the local network area (AREA1) assigned to the calling subscriber (A) of the connection request, and that the service unit (SCP) of the public communications network is triggered for the connection request by this service code.

3. A method according to claim 1, characterised in that the service unit (SCP) of the public communications network is triggered for a connection by a network access unit (LE1) of the public communications network providing a network access from the private communications network into the public communications network, when the network access unit (LE1) detects a connection request from the private communications network in the case of which the local network area (AREA1) of the calling subscriber (A) of the connection request does not correspond to the local network area (AREA3) to which the network access unit (LE1) is assigned.

4. A method according to claim 1, characterised in that in the private communications network (PRNET), the local network area code (AREA1) assigned to the calling subscriber (A) is entered in a connection request when the connection request is routed into the public communications network in a local network area (AREA1 to AREA3) which does not correspond to the local network area (AREA1) assigned to the calling subscriber (A) of the connection request, and that this entry is used by the service unit (SCP) of the public communications network to determine the local network area code assigned to the calling subscriber.

5. A method according to claim 1, characterised in that in the private communications network (PRNET), the local network area code assigned to the calling subscriber of a connection request is transmitted in addition to the connection request (CR2) into the public communications network (PUBNET) when the connection request is routed into the public communications network in a local network area (AREA1 to AREA3) which does not correspond to the local network area (AREA1) assigned to the calling subscriber (A) of the connection request.

6. A method according to claim 1, characterised in that the service unit (SCP) of the public communications network contacts a service unit of the private communications network to determine the local network area code assigned to the calling subscriber (A) of the connection request.

7. A method according to claim 1, characterised in that the private communications network (PRNET) is connected to the public communications network (PUBNET) via a plurality of gateways (G1 to G5) sited in different local network areas (AREA1 to AREA3), and that for a connection into the public communications network, a control unit of the private communications network in each case selects the gateway via which the least connection charges are incurred for the particular connection.

8. A method according to claim 1, characterised in that the communications network is formed by a virtual private communications network which comprises a plurality of subsidiary networks connected to one another via connections of the public network.

9. A service unit (SCP) for supporting the provision of the subscriber number of the calling subscriber (A) in connection requests routed from a private communications network (PRNET) into a public communications network (PUBNET), characterised in that the service unit (SCP) is designed such that, when it is triggered for a connection request routed from the private communications network (PRNET) into the public communications network (PUBNET) in a local network area (AREA1 to AREA3) which does not correspond to the local network area (AREA1) assigned to the calling subscriber (A) of the connection request, it determines the local network area code assigned to the calling subscriber (A) of the connection request and ensures that this code is entered in the connection request as local network area code of the calling subscriber.

10. A private communications network (PRNET) with one or more gateways (G1 to G5) for the transmission of connection requests from calling subscribers (A) of the private communications network (PRNET) into a public communications network (PUBNET), characterised in that the private communications network (PRNET) is provided with a control unit (PABX1) which is designed such that, when a connection request is routed into the public communications network (PUBNET) in a local network area (AREA1 to AREA3) which does not correspond to the local network area (AREA1) assigned to the calling subscriber (A) of the connection request, it triggers a service unit (SCP) of the public-communications network for this connection request, which service unit (SCP) then determines the local network area code assigned to the calling subscriber (A) of the connection request and ensures that this code is entered in the connection request as local network area code of the calling subscriber (A).

* * * * *